US012576655B2

(12) United States Patent
Nihashi

(10) Patent No.: US 12,576,655 B2
(45) **Date of Patent: *Mar. 17, 2026**

(54) PRINTER

(71) Applicant: Toshiba Tec Kabushiki Kaisha, Tokyo (JP)

(72) Inventor: Kiyotaka Nihashi, Mishima Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 114 days.

This patent is subject to a terminal disclaimer.

(21) Appl. No.: 18/410,387

(22) Filed: Jan. 11, 2024

(65) Prior Publication Data

US 2024/0359491 A1 Oct. 31, 2024

(30) Foreign Application Priority Data

Apr. 25, 2023 (JP) ................................ 2023-071612

(51) Int. Cl.

| | |
|---|---|
| ***B41J 15/16*** | (2006.01) |
| ***B41J 2/32*** | (2006.01) |
| ***B41J 3/407*** | (2006.01) |
| ***B41J 15/02*** | (2006.01) |
| ***B41J 15/04*** | (2006.01) |

(52) U.S. Cl.

CPC ............... *B41J 15/165* (2013.01); *B41J 2/32* (2013.01); *B41J 3/4075* (2013.01); *B41J 15/02* (2013.01); *B41J 15/04* (2013.01)

(58) Field of Classification Search

CPC . B41J 15/16; B41J 15/165; B41J 15/02; B41J 15/04; B41J 3/407; B41J 3/4075; B41J 2/315; B41J 2/32

See application file for complete search history.

(56) References Cited

U.S. PATENT DOCUMENTS

| | | | |
|---|---|---|---|
| 2018/0065383 | A1 | 3/2018 | Teh et al. |
| 2019/0152240 | A1 | 5/2019 | Teh et al. |

(Continued)

FOREIGN PATENT DOCUMENTS

| | | | |
|---|---|---|---|
| EP | 1219454 | A2 | 7/2002 |
| JP | H08-151149 | A | 6/1996 |
| JP | 2000-016651 | A | 1/2000 |

(Continued)

OTHER PUBLICATIONS

Extended European Search Report mailed May 13, 2024 in corresponding European Patent Application No. 24155888.1, 8 pages.

(Continued)

*Primary Examiner* — Douglas X Rodriguez
*Assistant Examiner* — Kendrick X Liu
(74) *Attorney, Agent, or Firm* — Kim & Stewart LLP

(57) ABSTRACT

According to an embodiment, a printer includes a damper that applies tension to continuous paper by moving a predetermined distance toward the continuous paper in a conveying path of the continuous paper to be conveyed. The printer further includes a limiter that switches a state of the damper between a non-limited state in which a moving distance of the damper is not limited and a limited state in which the moving distance of the damper is limited to reduce tension to be applied to the continuous paper.

20 Claims, 12 Drawing Sheets

(56) References Cited

U.S. PATENT DOCUMENTS

2021/0187982 A1* 6/2021 Kakui .................... B41J 3/4075
2024/0359490 A1* 10/2024 Nihashi .................. B41J 3/4075

FOREIGN PATENT DOCUMENTS

JP 2010-208319 A 9/2010
JP 2018039149 A 3/2018
JP 2019006603 A 1/2019

OTHER PUBLICATIONS

Notice of Reasons for Refusal (First Office Action) mailed Oct. 14, 2025 in corresponding Japanese Patent Application No. 2023-071612, with English machine translation, 6 pages.

* cited by examiner

PRINTER

CROSS-REFERENCE TO RELATED APPLICATIONS

This application is based upon and claims the benefit of priority from the prior Japanese Patent Application No. 2023-71612, filed on Apr. 25, 2023, the entire contents of which are incorporated herein by reference.

FIELD

An embodiment to be described here generally relates to a printer.

BACKGROUND

In the past, a linerless label printer has included a damper. Linerless label paper is supplied by being unwound from rolled paper, and large force is necessary to peel off the linerless label paper from the rolled paper. According to a damper that applies tension to paper unwound from the rolled paper, it is possible to prevent printing defects from occurring due to paper that is not appropriately fed to a print head. Further, the damper mechanism is also effective in the case where rolled paper having a large diameter, which needs large force for unwinding due to inertia, is used.

In such a printer having the damper mechanism, in the case where label paper in which a label is attached to base paper is used, the label peels off. A cutter that cuts the label paper is on a downstream side of a print head in the conveying direction of paper. For this reason, in the case where a distance between the cutter and the print head is large, it is necessary to return a label adjacent to a printed label to a position where printing on the adjacent label is possible after the label paper is cut between the printed label and the adjacent label. At this time, a label peels off in some cases at a position of paper curved by the damper.

DETAILED DESCRIPTION

Figure 1:
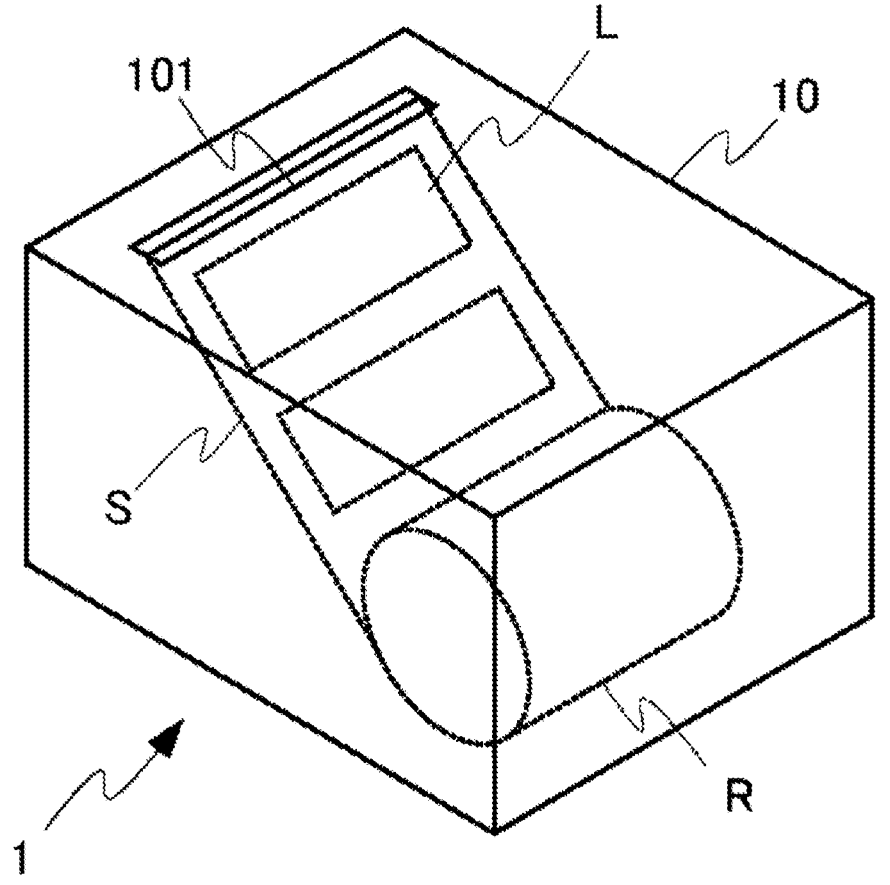
FIG. 1 is a schematic perspective view showing a printer that houses rolled paper according to an embodiment.

According to an embodiment, a printer includes: a print head; a feed roller; a damper; and a limiter. The print head prints on continuous paper unwound from a roll around which the continuous paper is wound. The feed roller conveys the continuous paper via the print head. The damper applies tension to the continuous paper by moving a predetermined distance toward the continuous paper in a conveying path of the continuous paper to be conveyed by the feed roller. The limiter switches a state of the damper between a non-limited state in which a moving distance of the damper is not limited and a limited state in which the moving distance of the damper is limited to reduce tension to be applied to the continuous paper.

An embodiment will be described below with reference to the drawings. In the drawings, the same configuration will be denoted by the same reference symbol.

(Configuration of Printer)

Figure 2:
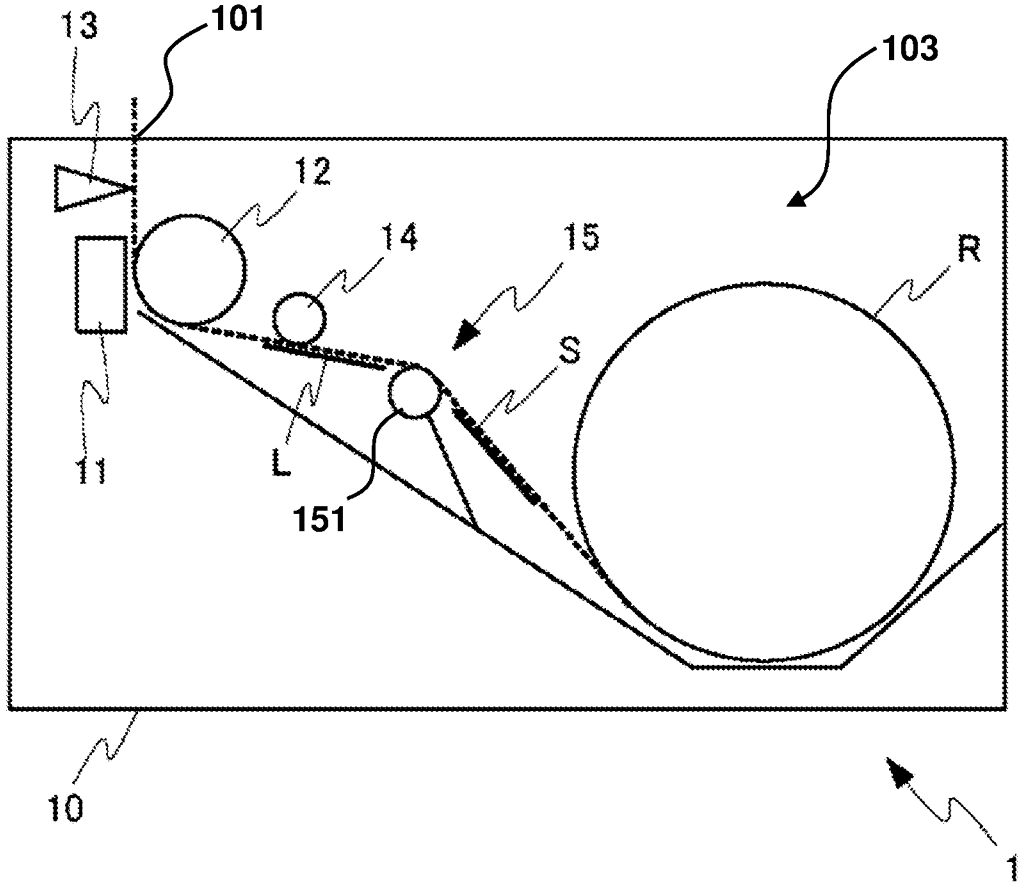
FIG. 2 is a schematic side view showing an internal configuration of the printer according to the embodiment.

A configuration of a printer according to this embodiment will be described. FIG. 1 is a schematic perspective view showing the printer that houses rolled paper according to this embodiment. FIG. 2 is a schematic side view showing an internal configuration of the printer according to this embodiment.

As shown in FIG. 1 and FIG. 2, a printer 1 according to this embodiment is a thermal printer. The printer 1 has a linerless label printing mode and a label printing mode as printing modes. The linerless label printing mode is a mode for printing on linerless label paper unwound from rolled paper R. The label printing mode is a mode for printing on a label L attached to base paper S (label paper) unwound from the rolled paper R. The printing mode is changed by, for example, a user's operation depending on whether the rolled paper R housed in the printer 1 is rolled paper in which linerless label paper is wound around a roll or rolled paper in which the base paper S is wound around a roll. As shown in FIG. 1 and FIG. 2, the printer 1 includes a casing 10, a print head 11, a platen roller 12, a cutter 13, an auxiliary roller 14, a damper 15, and a limiter 16 (see FIG. 6 and FIG. 7).

The casing 10 is formed into a substantially box shape and has a housing space 103 for housing the above-mentioned components and the rolled paper R. The casing 10 includes, on part of its upper surface, an ejection port 101 for ejecting printed paper. The rolled paper R shown in the figures includes, for example, the base paper S wound around a core (not shown). The base paper S is continuous paper on which a plurality of labels L is attached consecutively at intervals. The label L is thermal paper, an adhesive being applied to one surface of the label L. In the following description, the side on which the label L is attached will be referred to as a front surface of the base paper S. Further, the side opposite to the side on which the label L is attached will be referred to as a back surface of the base paper S.

The print head 11 is provided in the vicinity of the ejection port 101 and includes a plurality of heating elements adjacent to each other in the width direction of the label L. The plurality of heating elements generates heat in response to input pulse waves. Thus, the print head 11 forms an image (prints) on the label L. The platen roller 12 is a feed roller that is provided to crimp the label L to the print head 11 from the side of the back surface of the base paper S. The platen roller 12 conveys, by being driven to rotate, the base paper S unwound from the rolled paper R such that the base paper S is ejected from the ejection port 101.

The cutter 13 shown in FIG. 2 is provided closer to the ejection port 101 than the print head 11, i.e., on the downstream side of the print head 11 in the conveying direction. The cutter 13 cuts the base paper S between the label L on which the print head 11 has printed and the label L adjacent to this label L. The damper 15 shown in FIG. 2 is provided between the rolled paper R and the platen roller 12 in the conveying direction of the base paper S. The damper 15 applies tension to the base paper S located between the rolled paper R and the platen roller 12 by pressing the base paper S from the side of the front surface of the base paper S. Note that the damper 15 will be descried below in detail together with the limiter 16.

The auxiliary roller 14 shown in FIG. 2 is provided between the platen roller 12 and the position where the damper 15 presses the base paper S. The auxiliary roller 14 abuts on the back surface of the base paper S pressed by the damper 15 and assists in application of tension by the damper 15.

(Configurations of Damper and Limiter)

Figure 3:
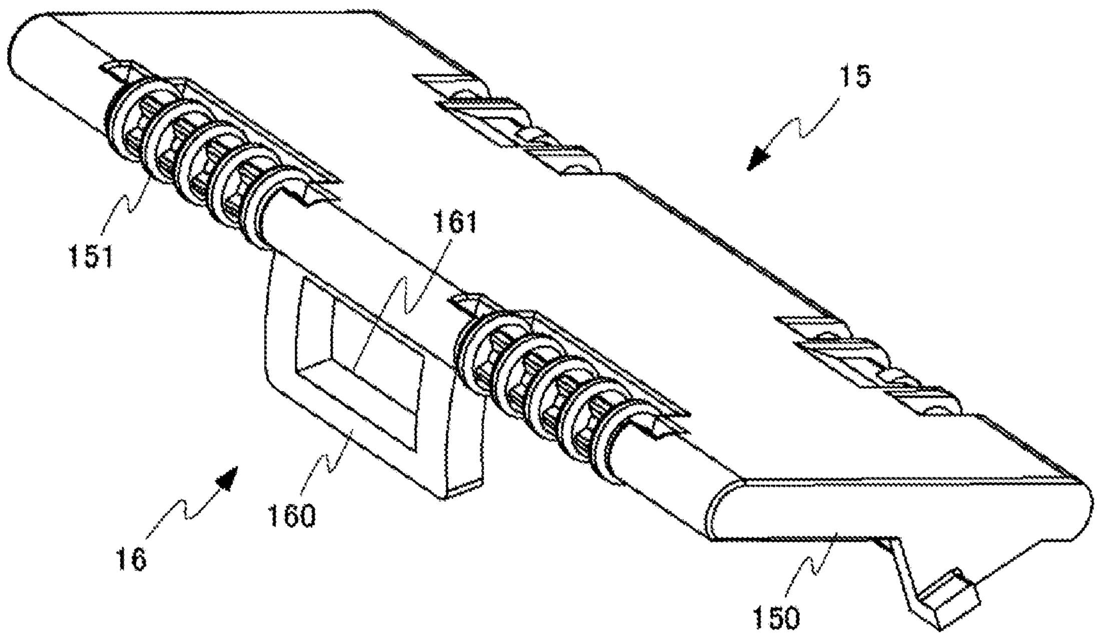
FIG. 3 is a top perspective view showing a configuration of a damper according to the embodiment.
Figure 4:
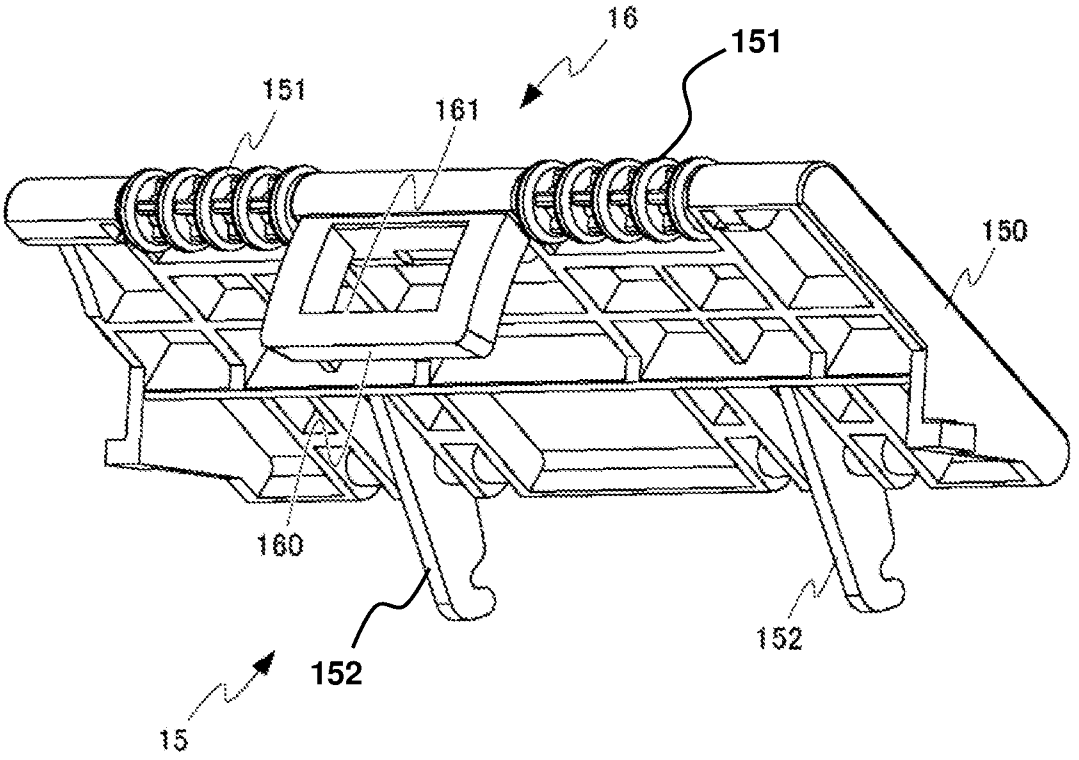
FIG. 4 is a bottom perspective view showing the configuration of the damper according to the embodiment.
Figure 5:
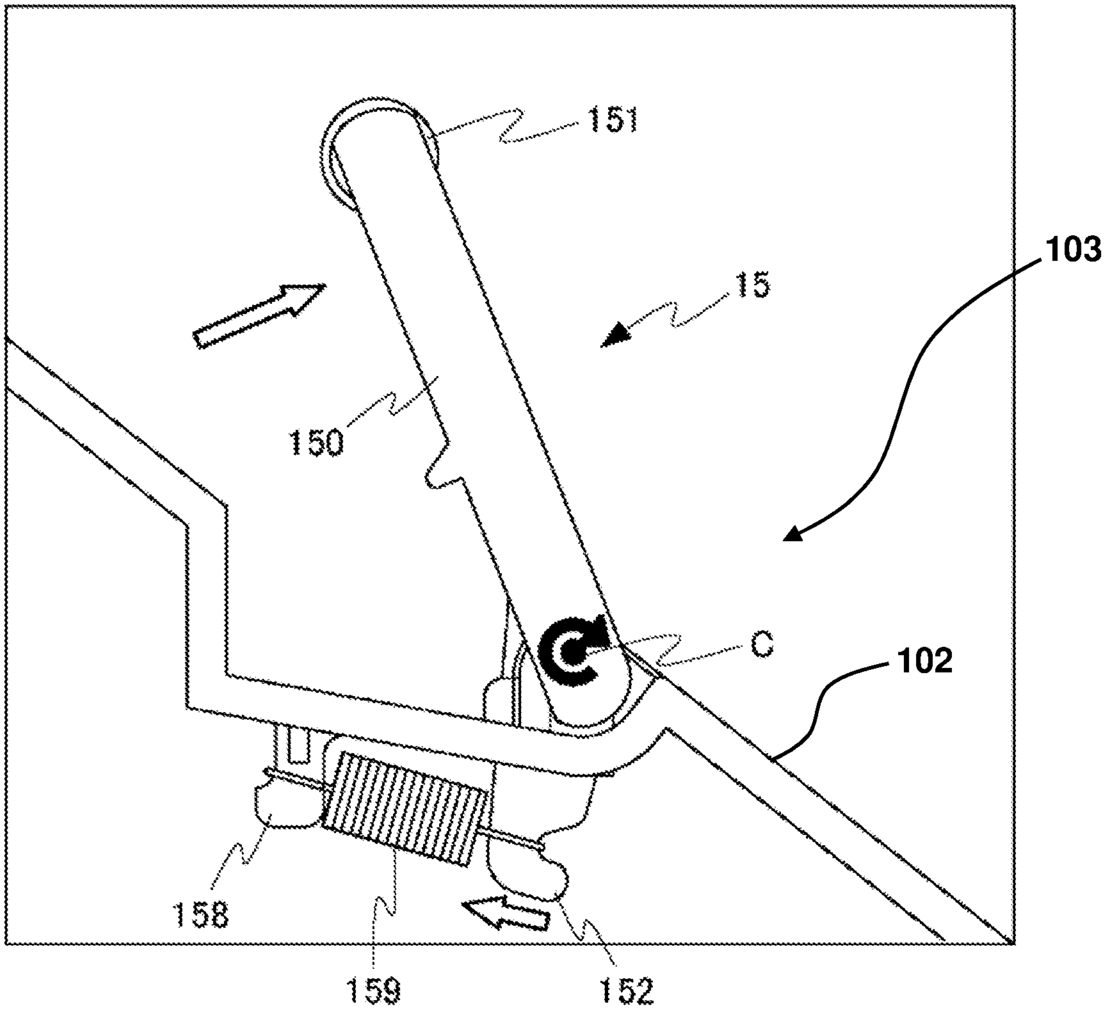
FIG. 5 is a schematic side view showing the damper biased by a tension spring according to the embodiment.
Figure 6:
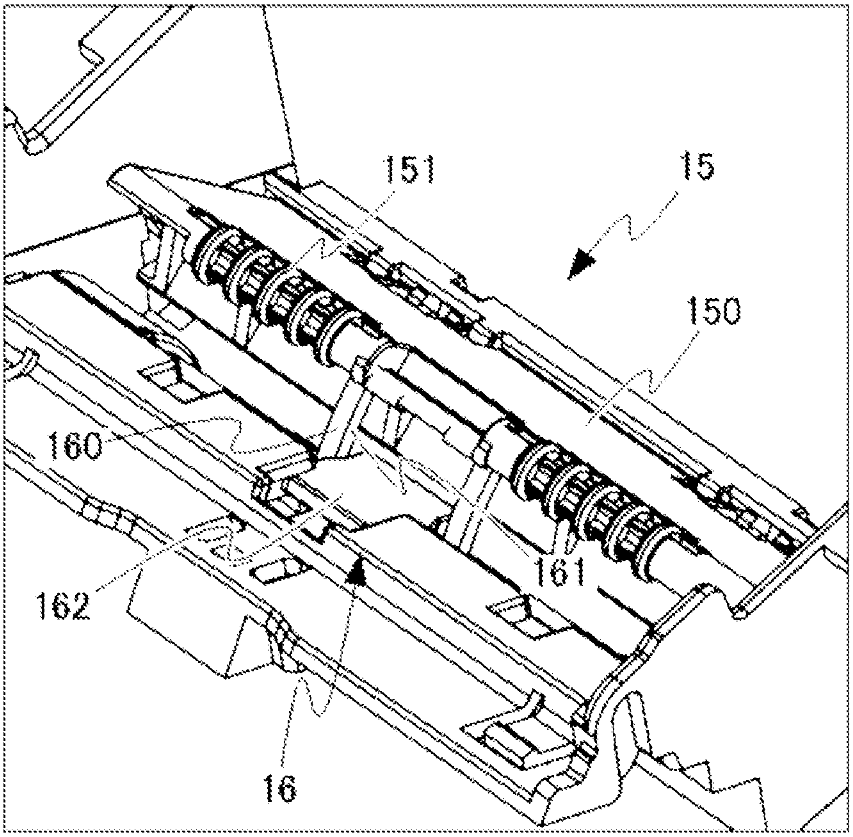
FIG. 6 is a perspective view showing the damper in a limited state according to the embodiment.
Figure 7:
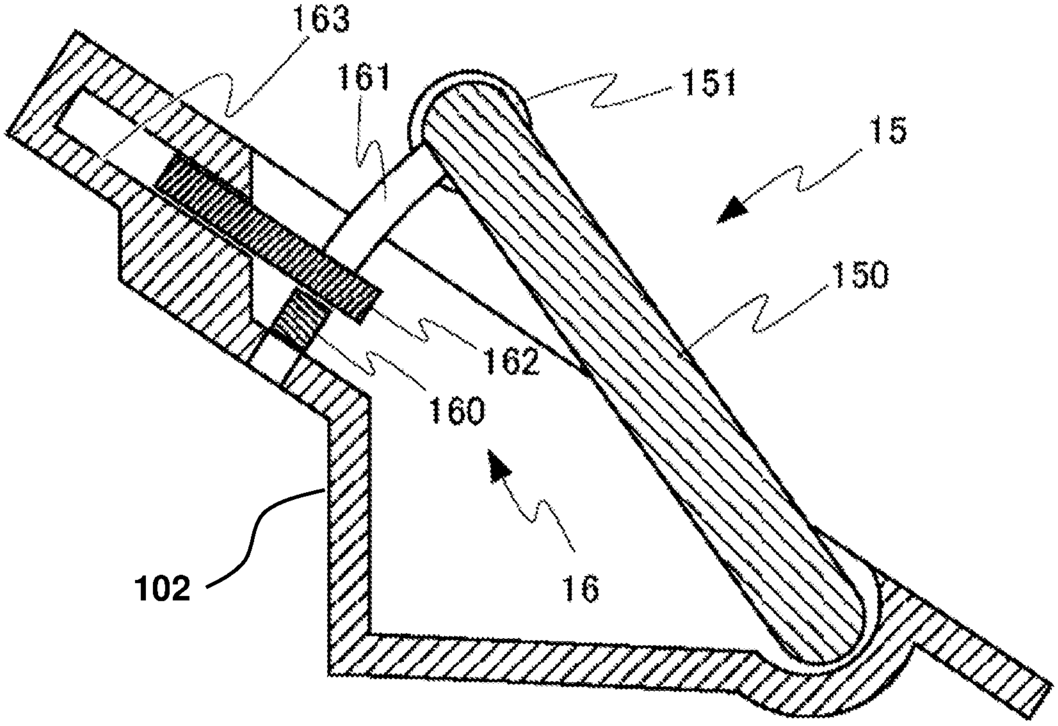
FIG. 7 is a cross-sectional side view showing the damper in the limited state according to the embodiment.
Figure 8:
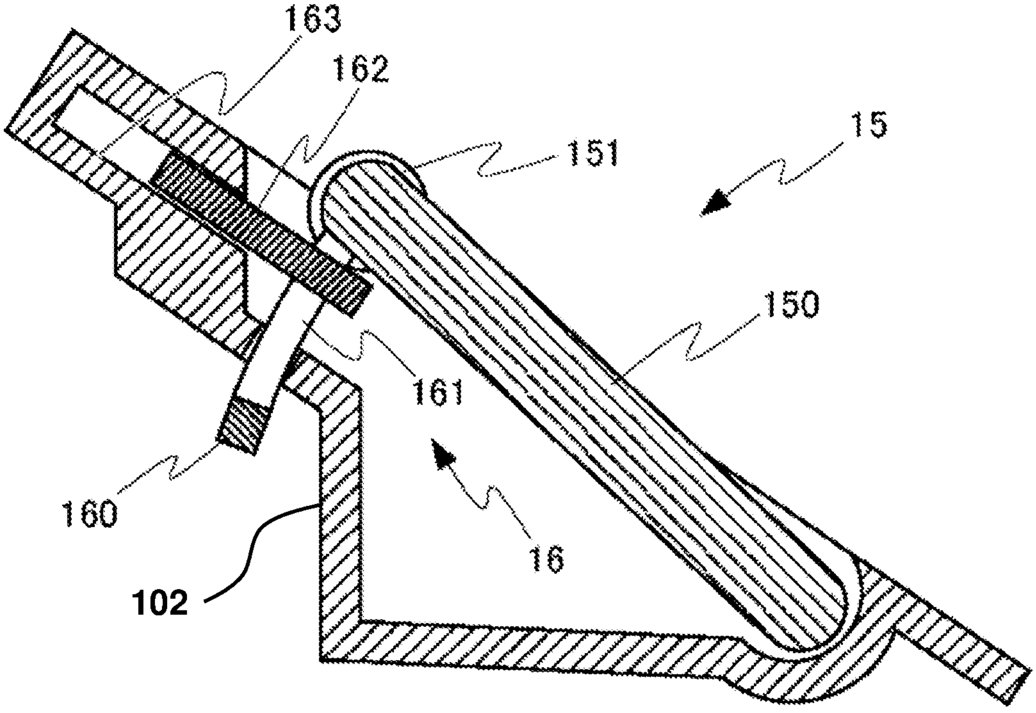
FIG. 8 is a perspective view showing the damper that is in the limited state and swung in a direction opposite to a biasing direction according to the embodiment.
Figure 9:
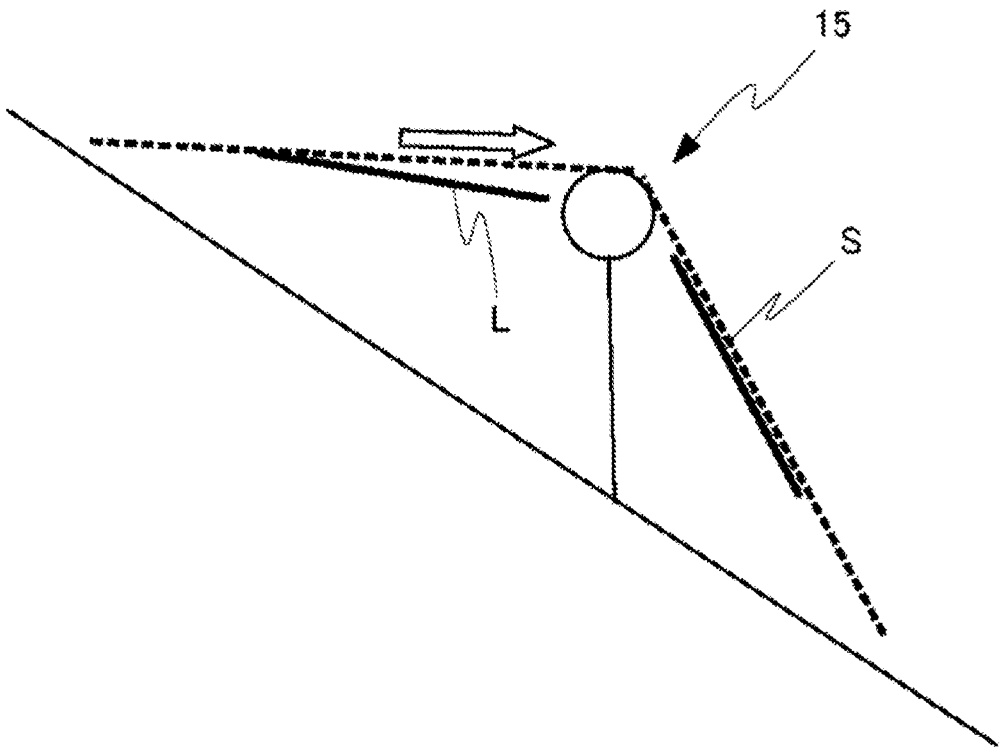
FIG. 9 is a schematic diagram showing label paper to which tension is applied by the damper in a non-limited state according to the embodiment.
Figure 10:
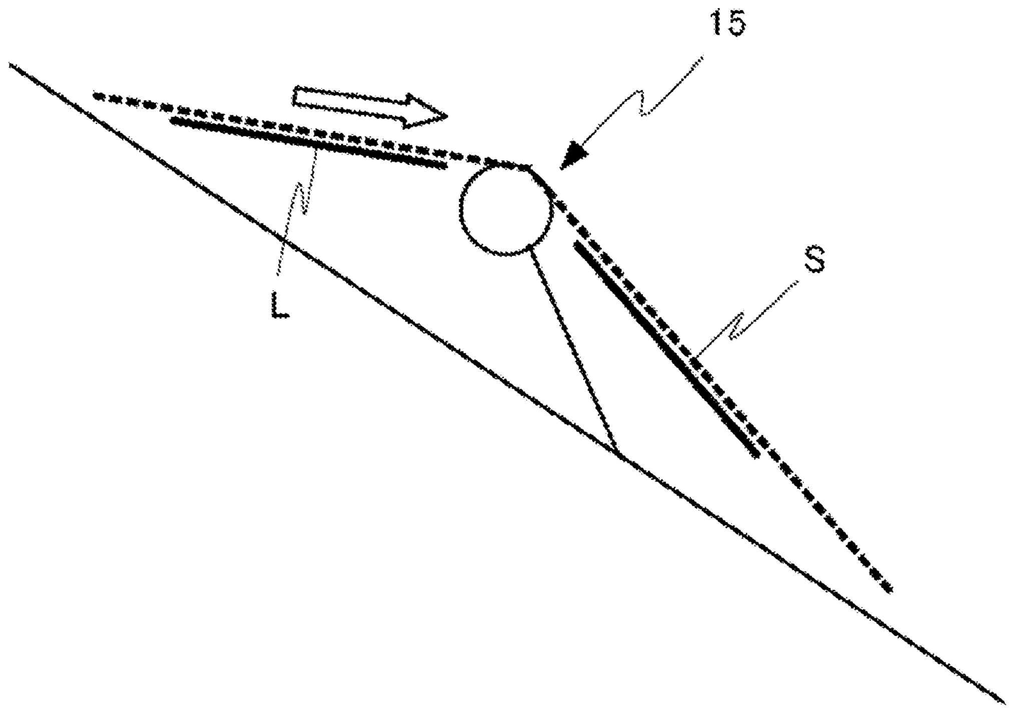
FIG. 10 is a schematic diagram showing the label paper to which tension is applied by the damper in the limited state according to the embodiment.

Configurations of the damper 15 and the limiter 16 according to this embodiment will be described. FIG. 3 and FIG. 4 are respectively a top perspective view and a bottom perspective view showing a configuration of the damper according to this embodiment. FIG. 5 is a schematic side view showing the damper 15 biased by a tension spring 159 in this embodiment. FIG. 6 and FIG. 7 are respectively a perspective view and a cross-sectional side view showing the damper 15 in a limited state according to this embodiment. FIG. 8 is a cross-sectional side view showing the damper 15 that is in the limited state and swung in a direction opposite to a biasing direction according to the embodiment. FIG. 9 is a schematic diagram showing label paper to which tension is applied by the damper 15 in a non-limited state according to the embodiment. FIG. 10 is a schematic diagram showing the label paper to which tension is applied by the damper 15 in the limited state according to the embodiment. Note that for description, the limiter 16 is omitted in FIG. 5 and a lever 152 is omitted in FIG. 7 and FIG. 8.

As shown in FIG. 3 and FIG. 4, the damper 15 includes a body portion 150, two roller groups 151, and two levers 152. The body portion 150 is a substantially plate-shaped member formed wide corresponding to the width of the base paper S. The two roller groups 151 are provided spaced apart from each other in the width direction of the body portion 150 at one end portion in the direction orthogonal to the width direction (orthogonal direction). Each of the two roller groups 151 includes a plurality of rollers.

The two levers 152 are provided spaced apart from each other in the width direction at the other end portion in the orthogonal direction of the body portion 150. As shown in FIG. 5, the body portion 150 is provided on a bottom wall 102 forming the housing space 103 of the casing 10 at the vicinity of the other end portion in the orthogonal direction such that the body portion 150 is swingable around a rotation axis C. The two levers 152 penetrates the bottom wall 102 forming the housing space 103 of the casing 10 while the body portion 150 is mounted in the casing 10. Two mounting portions 158 corresponding to the two levers 152 are provided on the back surface side of the bottom wall 102, i.e., on the surface opposite to the surface forming the housing space 103.

The two levers 152 and the two mounting portions 158 corresponding thereto are connected by the tension spring 159. In this way, the damper 15 is constantly biased by the tension spring 159 to swing clockwise in FIG. 5 and presses the base paper S between the auxiliary roller 14 and the rolled paper R. At this time, the two roller groups 151 of the damper 15 abut on the front surface of the base paper S, which reduces the friction that occurs between the damper 15 and the base paper S.

As shown in FIG. 3, FIG. 4, FIG. 6, and FIG. 7, the limiter 16 includes a to-be-locked body 160 and a locking body 162. The to-be-locked body 160 is provided between the two roller groups 151 at the one end portion in the orthogonal direction of the body portion 150 of the damper 15. The to-be-locked body 160 is a substantially frame-shaped member that protrudes from the body portion 150 in the direction opposite to the biasing direction of the tension spring 159 of the damper 15 and includes an opening 161 penetrating in the radial direction of the rotation axis C.

As shown in FIG. 6 and FIG. 7, the locking body 162 is a substantially plate-shaped member that is guided to be movable in the radial direction of the rotation axis C by a guiding portion 163 formed as two grooves facing each other in the width direction of the damper 15. The locking body 162 protrudes from the guiding portion 163 toward the rotation axis C so as to be inserted through the opening 161. The locking body 162 protrudes from the guiding portion 163 and engages with the to-be-locked body 160 to lock the damper 15 (see FIG. 7). At this time, the damper 15 is in the limited state in which the swing distance due to biasing of the tension spring 159 is limited. Meanwhile, in the case where the locking body 162 is housed in the guiding portion 163, does not engage with the to-be-locked body 160, and does not lock the damper 15, the damper 15 is in the non-limited state in which the swing distance due to biasing of the tension spring 159 is not limited. Note that as shown in FIG. 7, a through hole through which the to-be-locked body 160 can be inserted is formed in the bottom wall 102 forming the housing space 103 of the casing 10. Forming such a through hole allows the damper 15 to be swingable in a direction opposite to the biasing direction of the tension spring 159, i.e., in a direction away from the base paper S, as shown in FIG. 8.

As shown in FIG. 9, when the platen roller 12 causes the base paper S to move in a direction opposite to the print head 11 while the damper 15 is in the non-limited state, the label L peels off in the vicinity of the portion pressed by the damper 15. Meanwhile, as shown in FIG. 10, when the base paper S is caused to move in the opposite direction while the damper 15 is in the limited state, the curvature of the base paper S is reduced thereby preventing the label L from peeling off.

(Configuration and Operation of Control System)

Figure 11:
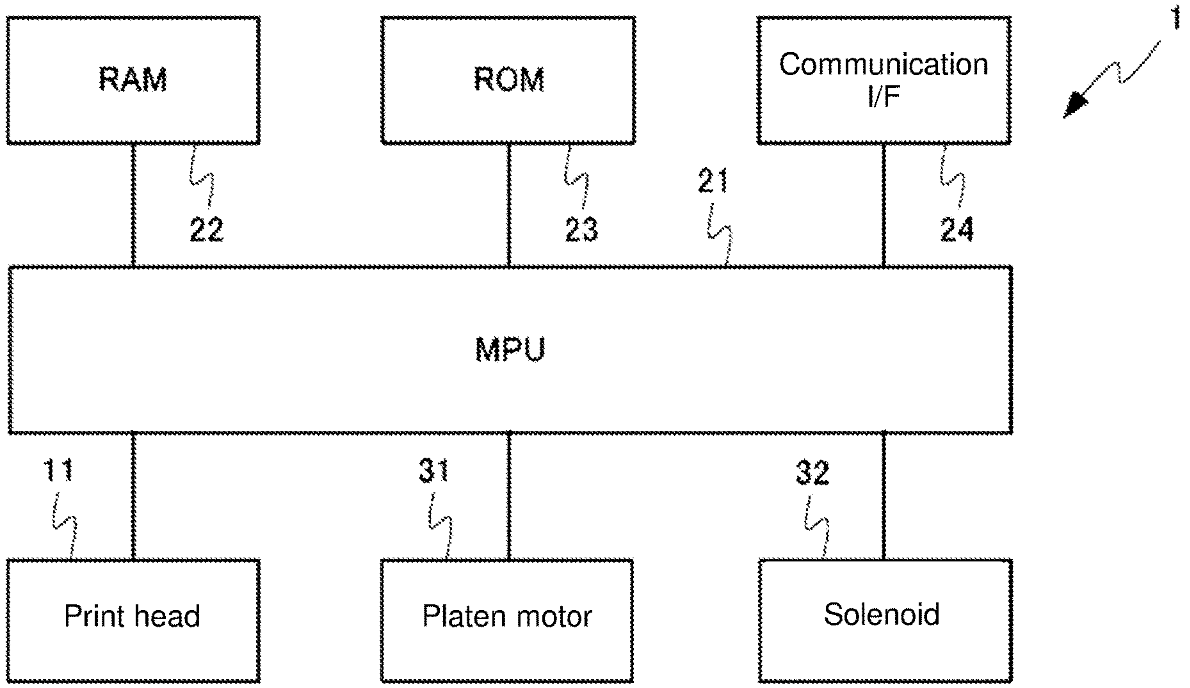
FIG. 11 is a block diagram showing a configuration of a control system of the printer according to the embodiment.

A configuration and operation of a control system of the printer according to this embodiment will be described. FIG. 11 is a block diagram showing a configuration of the control system of the printer according to this embodiment.

The printer 1 shown in FIG. 11 includes a processor and a memory. The processor is, for example, a micro processor unit (MPU) 22. The memory includes, for example, a Random Access Memory (RAM) 22 and a Read Only Memory (ROM) 23. Further, the printer 1 includes a communication interface (I/F) 24, a platen motor 31, and a solenoid 32.

The platen motor 31 causes the platen roller 12 to be driven to rotate. The solenoid 32 causes the locking body 162 to move in a straight line such that the locking body 162 protrudes from the guiding portion 163 (see the state shown in FIG. 7 or FIG. 8) or is housed in the guiding portion 163.

The communication I/F 24 communicates with a host device of the printer 1. The MPU 21 cooperates with the RAM 22 to control the print head 11 and the platen motor 31 and form (print) an image received from the host device on the label L. Further, the MPU 21 sets the state of the printer 1 to the linerless label printing mode or the label printing mode and executes state switching processing described below. The ROM 23 stores a program and data to be used in processing executed by the MPU 21.

(State Switching Processing)

Figure 12:
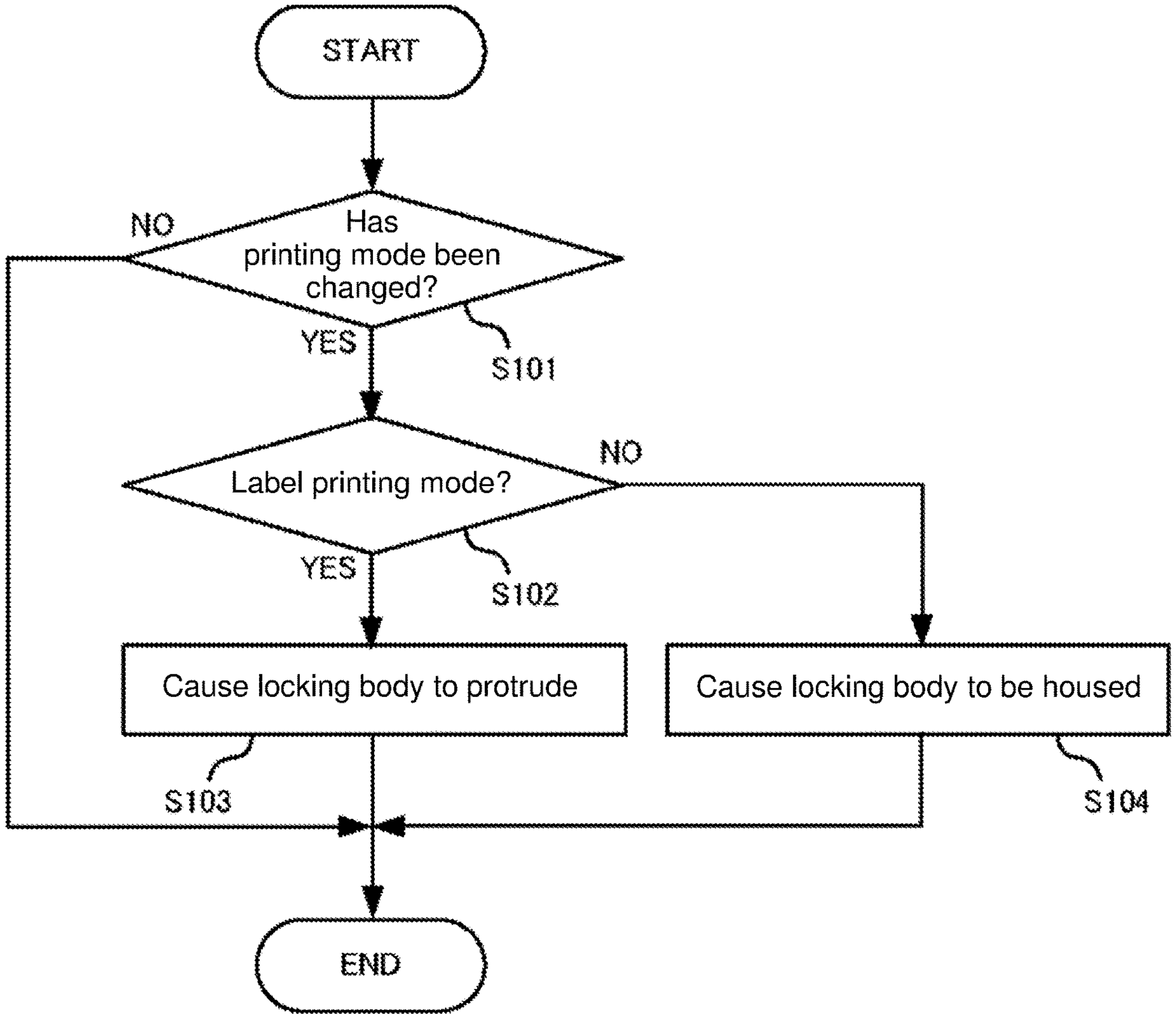
FIG. 12 is a flowchart showing state switching processing according to the embodiment.

The state switching processing will be described. FIG. 12 is a flowchart showing the state switching processing according to this embodiment. Note that the processing shown in FIG. 12 is executed at predetermined intervals.

As shown in FIG. 12, in Step S101, the MPU 21 determines whether or not the printing mode has been changed in the printer 1. In the case where it is determined that the printing mode has been changed (YES in S101), the processing of the MPU 21 proceeds to Step S102. In Step S102, the MPU 21 determines whether or not the printing mode has been changed the label printing mode. Meanwhile, in the case where it is determined in Step S101 that the printing mode has not been changed (NO in S101), the MPU 21 ends the state switching processing.

In the case where it is determined in Step S102 that the printing mode has been changed to the label printing mode (YES in S102), the processing of the MPU 21 proceeds to Step S103. In Step S103, the MPU 21 controls the solenoid 32 to cause the locking body 162 to protrude from the guiding portion 163 (e.g., FIG. 7), thereby causing the damper 15 to be in the limited state (e.g., FIG. 10). After causing the damper 15 to be in the limited state, the MPU 21 ends the state switching processing shown in FIG. 12.

Meanwhile, in the case where it is determined in Step S102 that the printing mode has not been changed to the label printing mode, i.e., the printing mode has been changed to the linerless label printing mode (NO in S102), the processing of the MPU 21 proceeds to Step S104. In Step S104, the MPU 21 controls the solenoid 32 to cause the locking body 162 to be housed in the guiding portion 163, thereby causing the damper 15 to be in the non-limited state. After causing the damper 15 to be in the non-limited state, the MPU 21 ends the state switching processing shown in FIG. 12.

In this way, the printer 1 causes the damper 15 to be in the limited state by locking the damper 15 against biasing force of the tension spring 159 such that tension to be applied to the base paper S is reduced. The printer 1 causes the damper 15 to be in the limited state to shorten the moving distance of the damper 15 as compared with that in the non-limited state. This allows the printer 1 to prevent the label L from peeling off due to the damper 15. Note that although the locking body 162 is caused to move by the solenoid 32 in the above-mentioned embodiment, the locking body 162 may be configured to move manually by a user of the printer 1. Further, although the printer 1 has been described to perform printing using a thermal method, another method may be used to perform printing. Further, the damper 15 does not necessarily need to swing. For example, the damper 15 may apply tension to the base paper S by causing a tip portion thereof to linearly move.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:

a print head that prints on continuous paper unwound from a roll around which the continuous paper is wound;

a feed roller that conveys the continuous paper via the print head;

a damper that applies tension to the continuous paper by moving toward the continuous paper in a conveying path of the continuous paper conveyed by the feed roller;

a tension spring that biases the damper to apply the tension to the continuous paper; and a limiter that switches a state of the damper between a non-limited state in which a moving distance of the damper is not limited and a limited state in which the moving distance of the damper is limited by locking the damper against a biasing force of the tension spring, to reduce the tension applied to the continuous paper.

2. The printer according to claim 1, further comprising a processor that is configured to perform, where label paper in which a label is attached to base paper is used as the continuous paper, control for driving the limiter to switch the state of the damper to the limited state.

3. The printer according to claim 2, wherein the processor is further configured to determine whether or not a mode for printing on the continuous paper has been changed, determine, where it is determined that the mode for printing has been changed, whether or not the mode for printing is a label printing mode in which the label paper is used, and perform, where it is determined that the mode for printing is the label printing mode, control for driving the limiter to switch the state of the damper to the limited state.

4. The printer according to claim 1, wherein the damper applies the tension to the continuous paper by moving toward the continuous paper in the conveying path on an upstream side of the print head in a conveying direction.

5. The printer according to claim 1, wherein the limiter includes a to-be-locked body provided on the damper, and a locking body that locks the damper by engaging with the to-be-locked body.

6. The printer according to claim 5, wherein the locking body is provided to be movable between a position where the locking body engages with the to-be-locked body and a position where the locking body does not engage with the to-be-locked body.

7. The printer according to claim 5, further comprising a solenoid that causes the locking body to move the position where the locking body engages with the to-be-locked body and the position where the locking body does not engage with the to-be-locked body.

8. The printer according to claim 7, further comprising a processor that is configured to control the solenoid to cause the damper to move.

9. A printer, comprising:

a print head that prints on continuous paper unwound from a roll around which the continuous paper is wound;

a feed roller that conveys the continuous paper via the print head;

a damper that applies tension to the continuous paper by moving toward the continuous paper in a conveying path of the continuous paper conveyed by the feed roller;

a limiter that switches a state of the damper between a non-limited state in which a moving distance of the damper is not limited and a limited state in which the moving distance of the damper is limited to reduce the tension applied to the continuous paper; and a processor that is configured to perform, where label paper in which a label is attached to base paper is used as the continuous paper, control for driving the limiter to switch the state of the damper to the limited state.

10. The printer according to claim 9, wherein the processor is further configured to determine whether or not a mode for printing on the continuous paper has been changed, determine, where it is determined that the mode for printing has been changed, whether or not the mode for printing is a label printing mode in which the label paper is used, and perform, where it is determined that the mode for printing is the label printing mode, control for driving the limiter to switch the state of the damper to the limited state.

11. The printer according to claim 9, wherein the damper applies the tension to the continuous paper by moving toward the continuous paper in the conveying path on an upstream side of the print head in a conveying direction.

12. The printer according to claim 9, further comprising:

a tension spring that biases the damper to apply the tension to the continuous paper.

13. The printer according to claim 9, wherein the limiter includes a to-be-locked body provided on the damper, and a locking body that locks the damper by engaging with the to-be-locked body.

14. The printer according to claim 13, wherein the locking body is provided to be movable between a position where the locking body engages with the to-be-locked body and a position where the locking body does not engage with the to-be-locked body.

15. The printer according to claim 13, further comprising a solenoid that causes the locking body to move the position where the locking body engages with the to-be-locked body and the position where the locking body does not engage with the to-be-locked body.

16. The printer according to claim 15, wherein the processor is configured to control the solenoid to cause the damper to move.

17. A printer, comprising:

a print head that prints on continuous paper unwound from a roll around which the continuous paper is wound;

a feed roller that conveys the continuous paper via the print head;

a damper that applies tension to the continuous paper by moving toward the continuous paper in a conveying path of the continuous paper conveyed by the feed roller; and a limiter that switches a state of the damper between a non-limited state in which a moving distance of the damper is not limited and a limited state in which the moving distance of the damper is limited to reduce the tension applied to the continuous paper, the limiter including a to-be-locked body provided on the damper and a locking body that locks the damper by engaging with the to-be-locked body.

18. The printer according to claim 17, wherein the locking body is provided to be movable between a position where the locking body engages with the to-be-locked body and a position where the locking body does not engage with the to-be-locked body.

19. The printer according to claim 17, further comprising:

a solenoid that causes the locking body to move the position where the locking body engages with the to-be-locked body and the position where the locking body does not engage with the to-be-locked body.

20. The printer according to claim 19, further comprising a processor that is configured to control the solenoid to cause the damper to move.

* * * * *